United States Patent

Tanaka et al.

[15] 3,655,512

[45] Apr. 11, 1972

[54] PROCESS FOR PRODUCING SACCHARIDES BY FERMENTATION

[72] Inventors: Katsunobu Tanaka, 1662 Honmachid; Takeo Suzuki, B-744 Kosha Apt. 1857, Kogasaka, both of Machida-shi, Japan

[22] Filed: July 31, 1968

[21] Appl. No.: 748,933

Related U.S. Application Data

[63] Continuation of Ser. No. 648,213, June 23, 1967, abandoned.

[30] Foreign Application Priority Data

July 4, 1966 Japan...................................41/43018

[52] U.S. Cl. ...........................................................195/28 R
[51] Int. Cl. ......................................................C12d 13/04
[58] Field of Search..............................................195/28, 3

[56] References Cited

UNITED STATES PATENTS 2,697,062  12/1964  Cramer......................................195/3
3,102,080  8/1963   Raspe et al. ..............................195/51
3,313,709  4/1967   Phillips......................................195/28

OTHER PUBLICATIONS

Iguchi et al., Agr. Biol. Chem. Vol. 29 No. 6 pages 589–590 (1965)

Primary Examiner—Alvin E. Tanenholtz
Attorney—Craig, Antonelli and Hill

[57]           ABSTRACT

Process for producing saccharides by fermentation which comprises culturing a microorganism capable of assimilating hydrocarbons and of producing saccharides under aerobic conditions in an aqueous nutrient medium containing at least one hydrocarbon as the main carbon source and an additive selected from the group consisting of at least one surface active agent, at least one antibiotic and mixtures thereof. The process gives good yields of sugars such as trehalose, glucose, mannose, arabinose, fructose, ribose, their glycosides and polymerized compounds.

13 Claims, No Drawings

PROCESS FOR PRODUCING SACCHARIDES BY FERMENTATION

This application is a continuation of copending application, Ser. No. 648,213, filed on June 23, 1967, now abandoned.

This invention relates to the art of fermentation and, more particularly, is directed to a process for producing saccharides by fermentation on an industrial scale. Even more particularly, the invention is directed to a method for significantly accelerating the production and accumulation of saccharides by fermentation by adding antibiotics or derivatives thereof and growth inhibitors to the culture medium in which said saccharides are being produced by fermentation.

As the result of much research on the production of saccharides by the use of inexpensive hydrocarbons as the starting material in a fermentation process, the present inventors have found that microorganisms which are able to assimilate or utilize hydrocarbons are capable of producing large amounts of glucose, fructose, ribose and polymers saccharides. Moreover, as the result of detailed examination of the types of saccharides produced, the conditions under which they are produced, possible ways of accelerating said production and the like, the present inventors have found that antibiotics, such as penicillin, or growth inhibitors, such as surface active agents, remarkably accelerate the production of saccharides by fermentation, thus resulting in the present invention.

Accordingly, one of the objects of the present invention is to provide a process for the production of saccharides by fermentation.

Another object of the present invention is to provide a process for producing saccharides by fermentation which may be carried out on an industrial scale in an efficacious and simple manner.

A further object of the invention is to provide a process for producing saccharides which may be carried out at low cost to give a high yield of product.

These and other objects and advantages of the present invention will become apparent to those skilled in the art from a consideration of the following specification and claims.

In accordance with the present invention, it has been found that remarkable amounts as well as an accelerated production of saccharides are obtained in a fermentation process when antibiotics, such as penicillin, streptomycin, etc. or derivative thereof, and growth inhibitors, such as surface active agents, etc., are added to the culture medium containing microorganisms having the ability to assimilate hydrocarbons under aerobic conditions, the culture medium containing hydrocarbons as the main carbon source. Either or both of said additives may be used.

Antibiotics which may be added to the culture medium in accordance with the present invention include penicillin, streptomycin, bacitracin, cycloserine and the like. Surface active agents which may be employed in the present invention are any of the suitable non-ionic, cationic, anionic or amphoteric surface active agents known in the art. Especially effects are the polyoxyethylene sorbitan fatty acid esters ($C_{12}$–$C_8$; Tween series), and the alkylamine salts thereof ($C_8$–$C_{18}$), the polyoxethylene alkylamines ($C_{12}$–$C_{18}$; Nymean series), the polyoxyethylene alkyl ethers ($C_{12}$–$C_{18}$), the polyoxyethylene alkyl allyl ethers ($C_8$–$C_{18}$), the alkyl trimethyl ammonium halides ($C_{12}$–$C_{18}$), the alkyl benzyl dimethyl ammonium halides ($C_{12}$–$C_{18}$), the alkyl pyridinium halides ($C_{12}$–$C_{18}$), the alkyl betaines ($C_{12}$–$C_{18}$), various higher fatty acids such as oleic acid, palmitic acid, stearic acid, etc. or the alkali or alkaline earth metal salts thereof, sorbitan monooleate, higher fatty acid esters such as the oleic acid esters of polyoxyethylene glycol, the palmitic acid esters of polyoxyethylene glycol, etc., and the like. Specific examples of such surface active agents include Nimean S–204 (polyoxyethylene alkylamine), Nonion E–215 (polyoxyethylene oleyl ether), Nonion LP–20R (sorbitan mono laurate), Nonion O–6 (polyoxyethylene glycol monooleate), Nonion L–4 (polyethylene glycole monolaurate), Nonion ST–221 (polyoxyethylene sorbitan monostearate), Tween 20, Tween 40, Nimid F–215 (polyoxyethylene alkylamide), etc.

The time at which these additives are actually added to the culture medium varies, depending upon the specific type employed. However, the greatest effect is noted when the additives are added at the same time that the microorganism is inoculated into the culture medium or during the initial period of culturing. It is to be understood that a mixture of two or more of the antibiotics or of the surface active agents may be added to the culture medium, if desired, such combinations also giving a significant acceleration in the production of saccharides by fermentation.

The favorable amount of additive employed may be varied within wide limits but, of course, must be such that it will not inhibit the growth of the microorganism employed. The variance in amounts depends upon the particular types of additive and microorganism used in the fermentation. An optimum amount is a total of from 50 to 2,000 micrograms of total additive per 1 ml. of culture solution.

Any of the microorganisms capable of assimilating hydrocarbons in order to produce saccharides may be employed in the process of the present invention. Such microorganisms include those belonging to the Arthrobacter, Brevibacterium, Corynebacterium, and Micrococcus.

Either a synthetic culture medium or a natural nutrient medium is suitable in the process of the present invention as long as it contains the essential nutrients for the growth of the particular microorganism employed. Such nutrients are well known in the art and include substances such as a carbon source, a nitrogen source, inorganic compounds and the like which are utilized by the microorganism employed in appropriate amounts. As noted above, hydrocarbons are used as the main carbon source in the process of the present invention. The preferred hydrocarbons are n-paraffins having from six to 30 carbon atoms or various kinds of hydrocarbon distillates containing the same. However, in principle, any of the hydrocarbons utilizable by microorganisms may be used. Carbon sources other than hydrocarbons may be present in the culture medium in minor amounts and include substances such as carbohydrates, for example, glucose, fructose, maltose, sucrose, starch, starch hydrolysate, molasses, etc., or any other suitable carbon source such as glycerol, mannitol, sorbitol, etc. Various mixtures thereof may be employed. As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, peptone, fish meal, casein hydrolysates, casamino acid, fish solubles, rice bran extract, etc., may be employed. These substances may also be used in mixtures of two or more. Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc. Any special nutrients required for the growth of the particular microorganism employed should also be added to the culture medium in appropriate quantities.

As noted above, hydrocarbons are used as the principal carbon source in the fermentation of the present invention with n-paraffins having from six to 30 carbon atoms being preferred. This includes straight- and branched- chain paraffins (alkanes) such as n-hexane, n-octane, n-decane, n-dodecane, n-hexadecane, isooctane, etc. However, other hydrocarbons such as kerosene and cycloparaffins such as cyclohexane and cyclooctane, straight- and branched-chain olefins such as pentene-2, hexene-1, octene-1, octene-2, etc., cycloolefins such as cyclohexene, aromatic hydrocarbons such as benzene, o-xylene, etc., and mixtures thereof and mixed hydrocarbons such as light oils, heavy oils, paraffin oils, etc., may also be employed.

The fermentation is carried out under aerobic conditions, such as aerobic shaking of the culture or with stirring of a submerged culture, at a temperature of about 25° to 40° C. and at a pH of about 4.0 to 9.0. If necessary, the pH is adjusted to within this range by the addition of a solution of urea, ammonia water or an ammonium carbonate solution to the medium during culturing. The fermentation is usually completed in from about 2 to 4 days under these conditions. It is complete when the total sugar content reaches its highest measured value.

After the completion of the fermentation, the fermentation liquor is filtered and then passed through a cation exchange resin so that any amino acids produced simultaneously with the saccharides, as well as the cations present, are absorbed and removed. The effluent is then passed through an anion exchange resin to remove organic acids and other acidic substances. The thusly obtained effluent is thereafter concentrated under reduced pressure or concentrated after decolorization. The saccharides may then be recovered therefrom.

The following examples are given merely as illustrative of the present invention and are not to be considered as limiting. Unless otherwise noted, the percentages therein are by weight.

EXAMPLE 1

*Arthrobacter paraffineus* 2411 ATCC 15591 is cultured under aerobic conditions with shaking in a culture medium containing 1.0 percent of meat extract, 1.0 percent of peptone and 0.5 percent of sodium chloride at a pH of 7.0 (before sterilization) for 24 hours in order to form a seed culture. The resultant seed culture is inoculated in a ratio of 10 percent by volume into a 5 liter jar fermentor containing 3 liters of a fermentation medium having the following composition (per liter of water):

0.2 % $K_2HPO_4$
0.1 % $MgSO_4·7H_2O$
0.002 % $MnSO_4·4H_2O$
0.002 % $FeSO_4·7H_2O$
0.001 % $ZnSO_4·7H_2O$
1.0 % $NH_4NO_3$
0.3 % cornsteep liquor Culturing is then carried out at 30° C. with an agitation of 600 r.p.m. and aeration with sterilized air at the rate of 1 liter per liter for 80 hours. At the beginning of culturing, 400 ml. of n-paraffins having from 10 to 18 carbon atoms is added to the medium. After 10 to 24 hours of culturing, 12,000 units of penicillin is added thereto. The pH of the culture medium is adjusted to within a range of 6.0 to 9.0 with ammonia water.

The amount of saccharides produced in the culture liquor at the completion of the fermentation is 15 g/l as total sugar. When culturing is carried out without the addition of penicillin but under the same conditions otherwise, the amount of saccharides produced is only 6 g/l as total sugar.

Although the composition and type of saccharides produced vary with the culturing conditions and with the particular strain employed, in the present example, a sugar polymer containing trehalose, glucose (and polymers thereof), mannose and arabinose constitutes the main sugars produced.

Separation of the sugars is carried out in the following way. After the completion of fermentation, 2.5 liters of fermentation broth is filtered using Celite 545 (manufactured by Wako Pure Chemical Industries Ltd.), and the bacterial cells are separated and removed therefrom. Thereafter, the solution is passed through 2 liters of a cation exchange resin (Diaion SK 1A (H type) Cationic exchanger resin of polystyrene sulfonate, manufactured by Mitsubishi Kasei) and washed with water. As a result, 3 liters of effluent is obtained. The effluent is then passed through 1 liter of an anion exchange resin (Diaion SA 200 (OH type) Anionic exchanger resin of the fourth amide of polystylene, manufactured by Mitsubishi Kasei). The thus obtained 4.3 liters of effluent (having a pH of 5.4) is concentrated to 100 ml. under reduced pressure. Thereto, a hydrochloric acid methanol solution is added so as to precipitate the saccharides. After being allowed to stand in a cold room, the precipitates produced are filtered and dried.

The final product comprises 25 grams of white saccharide mixture containing 8 grams of trehalose, 12 grams of glucose and 3 grams of mannosearabinose polymer.

EXAMPLE 2

Culturing is carried out with the same microorganism, the same medium and under the same conditions as described in Example 1. The effect on the production of saccharides by the addition of various antibiotics and surface active agents to the medium after 18 hours of culturing is shown in Table 1, which indicates the amounts of saccharides produced after 80 hours of culturing.

TABLE 1

| Additive | Amount added | Amount of saccharides produced (as total sugar) | |
|---|---|---|---|
| | | No addition | Addition |
| Penicillin G (potassium salt) | 50 units/ml. | 3 g/l | 12.1 g/l |
| Streptomycin sulfate | 10 units/ml. | 3 g/l | 8.2 g/l |
| Mitomycin | 5 units/ml. | 3 g/l | 11.0 g/l |
| Bacitracin | 20 units/ml. | 3 g/l | 11.3 g/l |
| Cycloserine | 50 units/ml. | 3 g/l | 8.5 g/l |
| Sorbitan monooleate | 1 mg/ml. | 3 g/l | 7.8 g/l |
| Tween 60 | 1 mg/ml. | 3 g/l | 6.9 g/l |
| Penicillin + Tween 40 | 4 units/ml. and 1 mg/ml., respectively | 3 g/l | 13.0 g/l |
| Nimean S-204 | 1 mg/ml. | 3 g/l | 9.5 g/l |

EXAMPLE 3

*Brevibacterium ketoglutamicum* 2473 ATCC 15588 is cultured using a distillate containing n-paraffins of 11 to 20 carbon atoms. The culturing is carried out in the same medium and under the same conditions as described in Example 1.

After 18 hours of culturing, 50 units of penicillin (per ml. of culture liquor) is added to the culture medium. The amount of saccharides produced after 92 hours of culturing is 6.0 g/l, as measured by the value of the total sugar content. When culturing is carried out under the same conditions but without the addition of the penicillin, the amount of saccharides produced is 2.0 g/l.

EXAMPLE 4

Culturing is again carried out under the same conditions and in the same medium as shown in Example 1, except that *Corynebacterium hydrocarboclastus* ATCC 15592 is used as the microorganism and light oil (petroleum kerosene) is used as the main source of carbon.

An addition of 100 units of penicillin per ml. of culture liquor is made to the culture medium. As a result, after 96 hours of culturing, the amount of saccharides produced is 5.0 g/l. When culturing is carried out under exactly the same conditions, but without the addition of penicillin, only 2.0 g/l of saccharides is produced.

EXAMPLE 5

The fermentation liquor obtained by culturing *Arthrobacter paraffineus* 2411 ATCC 15591 in the same medium and under the same conditions as described in Example 1 is filtered. Then, 2.5 liters of the resultant filtrate is desalted with the use of Diaion SK–1A (H type), and the precipitates produced with sulfuric acid are removed therefrom. Thereafter, an equivalent amount of methanol is added thereto so that the sugar polymer is precipitate. After recovering the methanol, the supernatant liquor is separated into a mixed solution of glucose, fructose, ribose, arabinose and trehalose by chromatography with the use of carbon (purified from "Shirasagi", Takeda Yakukko).

After dissolution in 2N sodium hydroxide, the sugar polymer precipitates are mixed with 1 liter of Fehling's solution. The saccharides precipitated as the copper salt are collected by centrifugal separation, washed with ethanol and treated with hydrochloric acid-acidic ethanol and ethanol solutions. This gives 5.2 grams of white sugar polymer. After hydrolysis, mannose, arabinose and amino sugars are obtained.

As noted above, the present invention is characterized by the addition of antibiotics or surface active agents or mixtures thereof to a culture liquor to produce and accumulate large quantities of saccharides therein by fermentation. The antibiotics may be used alone or the surface active agents may be used alone, or they may be used in combination. Various antibiotics and surface active agents have been specifically enumerated above, but various types thereof may be used within the scope of the present invention as long as they are not deleterious to the growth of the particular microorganism employed. Surface active agents are generally understood in the art to be synthetic organic compounds which display surface activity. These include wetting agents, detergents, penetrants, spreaders, dispersing agents, foaming agents, etc. All of these types of substances are intended to be included within the scope of the term "surface active agent" in the present application. Antibiotics are antibacterial substances of biological origin, and the term "antibiotic" is used in this context herein.

The invention being thus described, it will be obvious that the same may be varied in many ways. Such variations are not to be regarded as a departure from the spirit and scope of the invention, and all such modifications as would be obvious to one skilled in the art are intended to be included.

We claim:

1. A process for producing saccharides which comprises culturing a saccharide-producing microorganism capable of assimilating hydrocarbons and belonging to a genus selected from the group consisting of Arthrobacter, Brevibacterium, Corynebacterium and Micrococcus under aerobic conditions in an aqueous nutrient medium containing at least one hydrocarbon as the main carbon source and a substance selected from the group consisting of at least one antibiotic, at least one surface active agent and mixtures thereof, and recovering the saccharides produced from the resultant culture liquor.

2. The process of claim 1, wherein said hydrocarbon is selected from the group consisting of kerosene, light oils, heavy oils, naphtha, methane, ethane, propane, butane, n-paraffins having from six to 30 carbon atoms, natural gas and mixtures thereof.

3. The process of claim 1, wherein said microorganism is *Arthrobacter paraffineus* ATCC 15591.

4. The process of claim 1, wherein said microorganism is *Brevibacterium ketoglutamicum* ATCC 15588.

5. The process of claim 1, wherein said microorganism is *Corynebacterium hydrocarboclastus* ATCC 15592.

6. A process for producing saccharides selected from the group consisting of monosaccharides, oligosaccharides, and mixtures thereof which comprises culturing a saccharide-producing microorganism capable of assimilating hydrocarbons and belonging to a genus selected from the group consisting of Arthrobacter Brevibacterium, Corynebacterium and Micrococcus under aerobic conditions in an aqueous nutrient medium containing at least one hydrocarbon as the main carbon source and at least one surface active agent, and recovering saccharides produced from the resultant culture liquor.

7. The process of claim 6, wherein said surface active agent is selected from the group consisting of polyoxyethylene sorbitan fatty acid esters having from 12 to 18 carbon atoms, alkylamine salts having from eight to 18 carbon atoms, polyoxyethylene alkylamines having from 12 to 18 carbon atoms, polyoxyethylene alkyl ethers having from 12 to 18 carbon atoms, polyoxyethylene alkyl allyl ethers having from eight to 18 carbon atoms, alkyl trimethyl ammonium halides having from 12 to 18 carbon atoms, alkyl benzyl dimethyl ammonium halides having from 12 to 18 carbon atoms, alkyl pyridinium halides having from 12 to 18 carbon atoms, and alkyl betaines having from 12 to 18 carbon atoms, higher fatty acids, alkali and alkaline earth metal salts of higher fatty acids and higher fatty acid esters.

8. The process of claim 7, wherein said hydrocarbon is an n-paraffin of six to 30 carbon atoms.

9. The process of claim 8, wherein culturing is carried out at a temperature of from about 25° to 40° C. and at a pH of from 4.0 to 9.0.

10. A process for producing saccharides selected from the group consisting of monosaccharides, oligosaccharides and mixtures thereof which comprises culturing a saccharide-producing microorganism capable of assimilating hydrocarbons and belonging to a genus selected from the group consisting of Arthrobacter, Brevibacterium, Corynebacterium and Micrococcus under aerobic conditions in an aqueous nutrient medium containing at least one hydrocarbon as the main carbon source and at least one antibiotic, and recovering the saccharides produced from the resultant culture liquor.

11. The process of claim 10, wherein said antibiotic is selected from the group consisting of penicillin, streptomycin, bacitracin, mitomycin and cycloserine.

12. The process of claim 11, wherein said hydrocarbon is an n-pariffin of six to 30 carbon atoms.

13. The process of claim 12, wherein culturing is carried out at a temperature of from 25° to 40° C. and at a pH of from 4.0 to 9.0.

* * * * *

UNITED STATES PATENT OFFICE
CERTIFICATE OF CORRECTION

Patent No. 3,655,512                Dated April 11, 1972

Inventor(s) Katsunobu TANAKA and Takeo SUZUKI

It is certified that error appears in the above-identified patent and that said Letters Patent are hereby corrected as shown below:

In Column 1, after line 7, insert:

--Assignee: Kyowa Hakko Kogyo Co., Ltd., Tokyo, Japan--

Signed and sealed this 7th day of May 1974.

(SEAL)
Attest:

EDWARD M. FLETCHER, JR.　　　　　　C. MARSHALL DANN
Attesting Officer　　　　　　　　　　Commissioner of Patents